Figure 1:
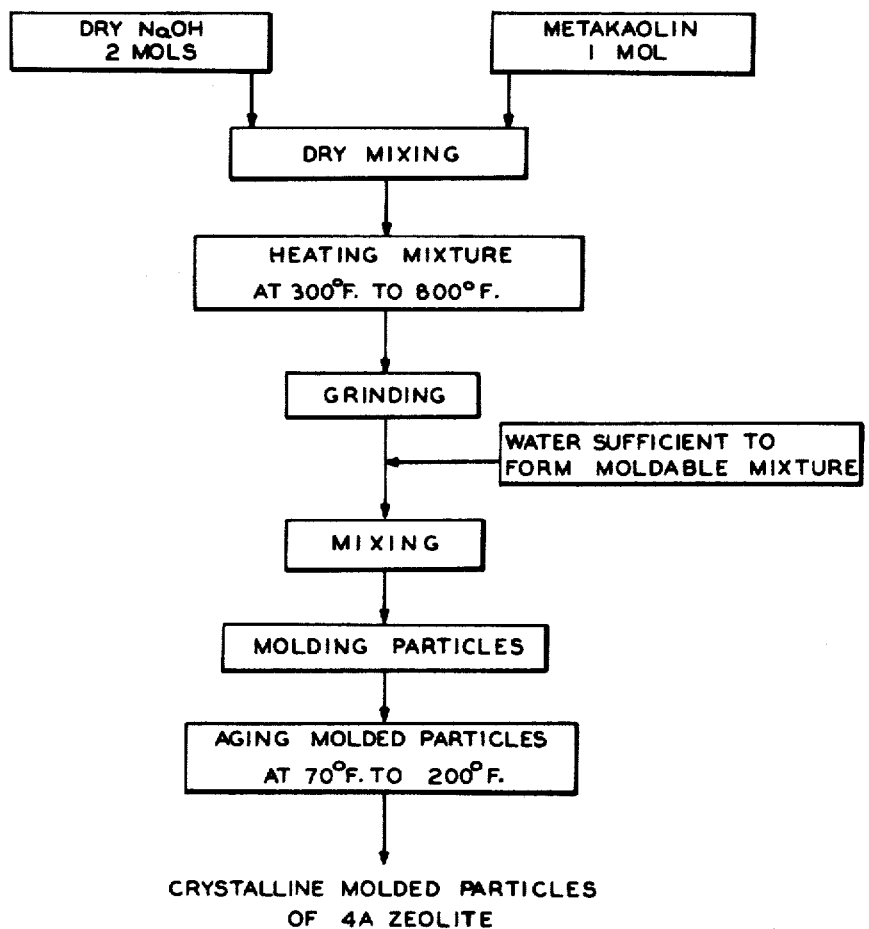

Aug. 13, 1963  W. L. HADEN, JR., ETAL  3,100,684
METHOD FOR PRODUCING SYNTHETIC CRYSTALLINE ZEOLITE AGGREGATES
Filed Dec. 16, 1960  2 Sheets-Sheet 1

INVENTORS
WALTER L. HADEN, JR.
FRANK J. DZIERZANOWSKI
BY

ATTORNEY

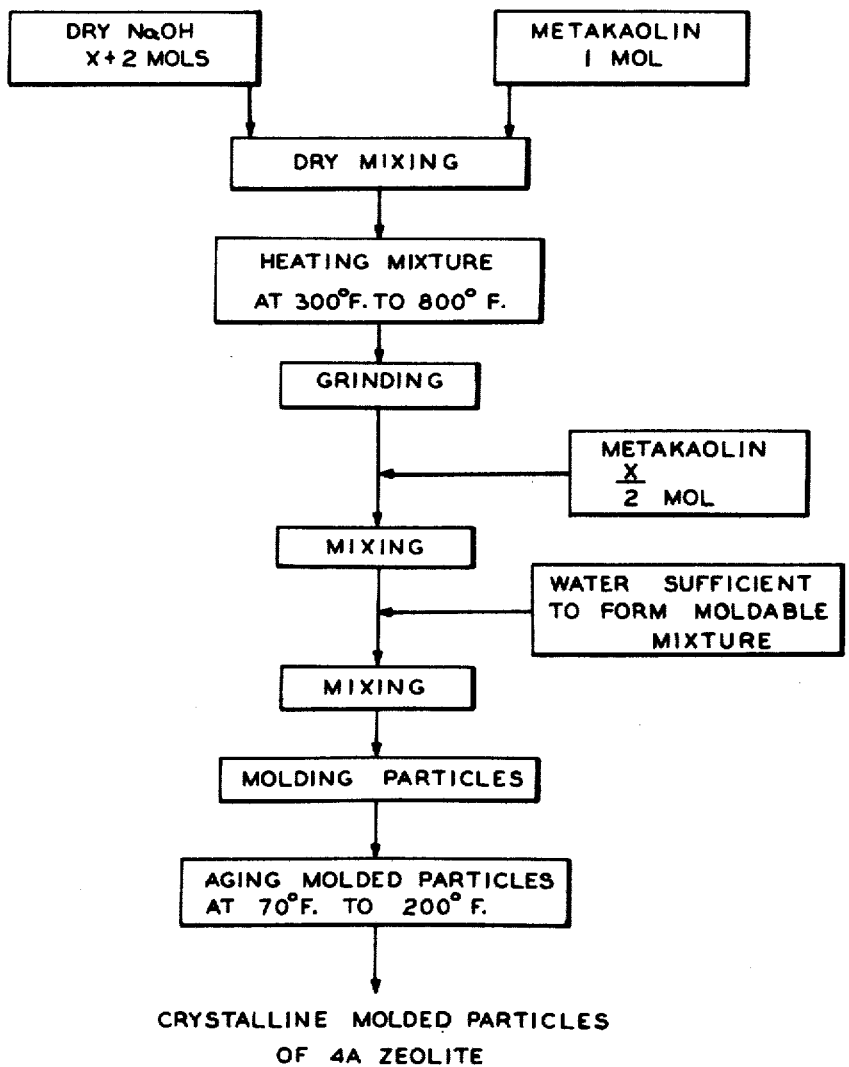

3,100,684
METHOD FOR PRODUCING SYNTHETIC CRYSTALLINE ZEOLITE AGGREGATES
Walter L. Haden, Jr., Metuchen, and Frank J. Dzierzanowski, Bound Brook, N.J., assignors to Minerals & Chemicals Philipp Corporation, Menlo Park, N.J., a corporation of Maryland
Filed Dec. 16, 1960, Ser. No. 76,146
10 Claims. (Cl. 23—112)

The subject invention relates to a method for producing a synthetic crystalline zeolite which, upon dehydration, yields a sorbent of controlled effective pore diameter and is generally known as a "molecular sieve." The invention relates, more specifically, to a method in which the sorbent and its zeolite precursor are provided in the form of relatively large coherent attrition-resistant crystalline aggregates, as opposed to pulverulent masses.

A development in the field of adsorbents which has attracted widespread interest has been the production of so-called "molecular sieves." These are synthetic, crystalline aluminosilicate materials chemically similar to many clays and feldspars, and belonging to the class of minerals known as zeolites. The zeolites possess the characteristic of being able to undergo dehydration with little, if any, change in crystal structure. When dehydrated, the crystals are interlaced with regularly spaced channels of molecular dimensions and of quite uniform size, which led to the term "molecular sieve."

Several types of sieves are commercially available, each of which has a characteristic size of pore. They are being or can be used for a wide variety of applications, some of those with the greatest potential being as a desiccant for drying a wide variety of materials to extremely low moisture content, in purifying high quality chemicals and in upgrading gasoline by selective removal of straight chain hydrocarbons. An application which has received recent wide publicity is as a carrier for high activity accelerators for the rapid cure of plastics and rubber, in which case the sieves greatly simplify storage and processing problems by maintaining the active chemical in latent state, isolated from the system, during processing and storing, releasing it to function in its normal maner at the elevated curing or vulcanization temperature.

Molecular sieves are available in several types designated, for example, as 3A, 4A and 5A. Type 3A and type 4A sieves are dehydrated potassium and sodium zeolites, respectively, and type 5A, the dehydrated calcium zeolite; the three zeolites have the same crystalline structure and are readily interchangeable by simple base-exchange procedures. The numerical positions of the type designations refer to approximate pore dimensions in angstrom units. The formula for members of the type A zeolites from which the type A sieves are prepared by dehydration may be represented by the following approximate empirical formula:

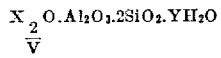

wherein "X" represents a metal in groups I and II of the periodic table, transition metals of the periodic table, hydrogen or ammonium, or mixtures of the aforementioned; "V" represents the valence of X; and Y varies with the nature of X and may be any number up to about 6. Thus, for example, the empirical formula for the 4A zeolite is $Na_2O.Al_2O_3.2SiO_2.4-5H_2O$. The sodium form of zeolite A may be considered the parent of the other type A zeolites in that it can be base-exchanged with other group I and with group II metal ions, etc., to prepare the other members of the type A zeolites described by the empirical formula given above.

The 4A molecular sieve, the activated form of sodium zeolite A, has the empirical formula $Na_2O.Al_2O_3.2SiO_2$ and is particularly useful as a selective sorbent for water, although it is also useful in selectively sorbing low molecular weight hydrocarbon vapors for mixtures of low molecular weight hydrocarbons with higher molecular weight hydrocarbons. For example, the 4A molecular sieve is useful in sorbing $C_2$ hydrocarbons from mixtures with higher molecular weight hydrocarbons. The 5A molecular sieve is useful in selectively sorbing normal hydrocarbons from mixtures with branched chain hydrocarbons.

The extensive use of the type A sieves is, however, curtailed by their high cost which reflects the involved processing as well as the relatively expensive raw materials involved in their preparation. The price of molecular sieves is at present prohibitive for all but a few specific commercial applications. Aside from their high cost, another detractive feature of the commercially available sieves and those described in the literature is that their physical form leaves much to be desired. Mineral sorbents find widespread use in moving and fixed bed adsorption processes; in these processes the sorbent must be employed in the form of coarse particles, i.e., particles as coarse as 4/8 mesh or as fine as 60/100 mesh. In slurry processes or other processes in which the sorbent is mixed with or carried cocurrent with the fluid, particles in the range 100/325 mesh are used; such particles must be free from fines, e.g., material finer than about 325 mesh since it is difficult to separate such fines from the fluid, as is known to those skilled in the art. In fluidized bed processes particles of 100/325 mesh are used; experience has shown that not more than about 20 percent of the weight of the particles should be finer than about 40 microns since such fines represent an economic loss during processing. In all of the aforementioned types of processes, the sorbent particles may be irregular in shape, but are preferably in the form of smooth or regularly contoured masses such as spheres or cylinders. In the case of the contact masses used in moving and fixed bed processes, it is desirable to employ smooth particles to minimize pressure drop in the system. Moreover, smooth particles are harder or more attrition-resistant than like particles of irregular contour and are less apt to wear away and produce undesirable dust during use, regeneration or other handling. In the case of the relatively fine particles used in the slurry and fluidized bed processes, spherical particles are preferred to irregular particles because of their superior resistance to attrition.

Prior art methods of producing synthetic crystalline type A zeolites are basically inconsistent with the provision of coarse particle size sorbents. In general it may be said that these methods for producing the type A zeolite involve the precipitation of the zeolite crystals from a dilute aqueous solution or suspension of reactants. The zeolite crystals obtained by such processes are inherently in finely divided, powdered form, typically 0.1 to 10 micron material. Occasionally somewhat coarser crystals, such as 100 microns or finer crystals, such as 0.01 micron, are produced. In order to agglomerate the powdered zeolites or sorbents, binders, such as colloidal clays or hydrous alumina are used. Typically, the zeolite powder is extruded with the binder, and pellets of suitable size are cut from the extrudate. The pellets are then fired to harden the binder. In order to produce pellets of adequate resistance to attrition, substantial quantities of binder are used, usually of the order of about 20 percent, based on the weight of the active sorbent. As a result, the pelleted sorbent is substantially diluted and the sorptive capacity of a unit weight is decreased in proportion to the quantity of binder used. Moreover, the coherency of the bound powder leaves much to be desired in that the material is relatively easily attrited during storage and use. Obviously, it would be highly desirable to be able to synthesize type A zeolites and molecular sieves directly in the form of large attrition-resistant aggregates of homogeneous polycrystalline composition and, more particularly, to synthesize such zeolites and sieves in the form of pellets or other regularly shaped masses of the desired particle size.

Accordingly, it is an object of the present invention to provide a method for preparing type A zeolites and sorbents which obviates the aforementioned difficulties.

Another object of the invention is the provision of a method to synthesize type A zeolites and molecular sieves directly in the form of coherent aggregates of substantially homogeneous polycrystalline composition as contrasted with the powdered form which results from prior art methods for making such zeolites.

A more particular object is the provision of such a method in which kaolin clay, an inexpensive, naturally occurring, abundant material, is employed as the sole source of silica and alumina.

Still another object of the invention is the provision of essentially pure homogeneous type A zeolites and sieves in the form of self-bonded, shaped masses which are highly resistant to attrition and which resist disintegration even in the presence of liquid water.

These and further objects and advantages are realized in accordance with the present invention which contemplates the production of sodium zeolite A in the form of self-bonded aggregates from a starting mixture of NaOH and metakaolin (a calcined form of kaolin clay of the empirical formula $Al_2O_3 \cdot 2SiO_2$).

The essence of our novel process for producing aggregates of zeolite A resides in initially reacting a finely divided, dry intimate mixture of NaOH and metakaolin at a temperature within the range of about 300° F. to about 800° F. to obtain a reaction product which is mixed with water at least stoichiometric for the formation therewith of the desired zeolite to form a mass of moldable consistency. The water-tempered mass, while still of moldable consistency, is formed into particles of the size and form desired in the final zeolite product, as by extrusion. The molded particles are then aged in a nonreactive medium such as air or oil and in the absence of an aqueous phase external to and in direct contact with the particles while controlling the temperature of the particles so that substantially no dehydration occurs. Initially, the molded particles harden with the formation of a uniform amorphous reaction product and upon further aging under the conditions described above, the molded particles crystallize into the desired 4A zeolite. During the latter stage of the aging step, the particles are generally less temperature sensitive than initially and somewhat higher aging temperatures may be utilized.

The crystallized product has the approximate empirical formula $Na_2O \cdot Al_2O_3 \cdot 2SiO_2 \cdot 4-5H_2O$ and is in the form of particles of essentially the same size and form as the molded particles obtained by mixing water with the reaction product of metakaolin and NaOH at elevated temperature.

The synthetic zeolite thus formed may then be dehydrated to provide a molecular sieve, which will have an effective pore diameter of about 4 angstrom units or, as is known in the art, the synthetic zeolite may be base-exchanged with other ions of metals in group I or with ions of metals of group II of the periodic table, hydrogen or ammonium ions, etc., to provide other type A zeolites which, upon dehydration becomes sieves of different effective pore diameters.

The invention will be further described with reference to the attached drawings. FIGURE 1 is a schematic flow sheet of one embodiment of the process of our invention. FIGURE 2 is a schematic flow sheet of another embodiment.

Referring to FIGURE 1, the simplest form of our invention involves the use of 2 mols of dry NaOH per mol of metakaolin in the initial mixture which is subjected to elevated temperature before it is mixed with water. It will be noted that such quantities represent proportions of $Na_2O$, $Al_2O_3$ and $SiO_2$ which are stoichiometric for the formation of the desired zeolite. In accordance with this form of the invention, the molded particles which are further reacted and crystallized to obtain the desired zeolite are made up simply by mixing water with this reaction product, no other sources of silica and alumina being added.

Referring to FIGURE 2, in accordance with another form of this invention, metakaolin is formed into a dry mixture with NaOH in amount in excess of that stoichiometric for the formation of the desired zeolite with the quantity of metakaolin in the mixture. In this case, the process described briefly above is modified by the addition to the high temperature reaction product (of the metakaolin and NaOH) of an additional quantity of metakaolin in the amount of about ½ mol per mol of NaOH employed in excess of stoichiometric quantity in the production of the high temperature reaction product. This addition is made before the reaction product is mixed with water and molded.

Therefore, in all forms of our invention, there will always be present in the molded particles quantities of $Na_2O$, $SiO_2$ and $Al_2O_3$ which are in the respective mol ratios of about 1:2:1.

The reason we sometimes prefer to employ an excess of NaOH in our original reaction mixture, as described above, is that in this manner we are able to reduce the load on the ovens or other equipment in which we carry out the initial reaction step. It will be obvious to those skilled in the art that reducing the load on ovens in any process will represent an economic advantage. It is possible to use an excess of alkali in our process because more than 2 mols of NaOH can react with each mol of metakaolin at elevated temperature. Therefore, by increasing the quantity of prereacted metakaolin-NaOH mixture that can be obtained from a given quantity of metakaolin, the desired economies are effected in the heating step. While metakaolin must be added to the resultant reaction product in amount such that the $Na_2O$ to $SiO_2$ ratio in the molded mass will be stoichiometric for the formation of the sodium zeolite A, this additional metakaolin, while entering into the end product, is not processed in the ovens.

From the brief description of our invention it may be seen that an important feature of our process resides in the formation of the reactants into coherent masses of the desired particle size and shape prior to the completion of the reaction therebetween whereby such form is retained throughout the process and the ultimate zeolite is obtained in the form of coherent shaped particles without recourse to auxiliary binders. In view of this, our process represents an advantage over prior art methods of making molecular sieve sorbents which require the step of binding the fine zeolitic product into the desired coarse particles.

Moreover, the method of our invention affords a means for producing undiluted type A zeolites and sieves whose hardness compares favorably with that of commercial clay or other bonded sieves.

Before going into further details of our process, a discussion of some of the problems and difficulties which our process overcomes is in order. To begin with, it should be pointed out that a mixture of water, NaOH, and metakaolin stoichiometric for the formation of the desired crystalline sodium zeolite A is capable of reacting to produce other sodium aluminosilicates as a contaminant to the desired zeolite or, depending on reaction conditions, to the exclusion of the desired zeolite. One of these contaminants is a material believed to be basic sodalite, and hereafter referred to as such. The X-ray diffraction characteristics of the material we refer to as sodalite are reported hereafter. Sodalite cannot be converted into the desired 4A zeolite by means presently known and for this reason its formation at any stage of the process is obviously very undesirable. While the production of sodalite contaminant frequently occurs to some extent in prior art processes for producing single crystals of the 4A zeolites from highly diluted reactants, the production of sodalite contaminant has been found to impose a severe problem in producing self-bonded aggregates of the 4A zeolite from metakaolin. We have discovered in processes for producing sodium zeolite A directly in the form of self-bonded particles from metakaolin that the formation of sodalite is mutually affected by the concentration of water in the original mixture of NaOH and metakaolin as well as by the temperature to which such mixture is subjected throughout the processing. More particularly, we have found that when water is present with unreacted alkali and metakaolin in amount such that the NaOH concentration is less than about 80 percent, the resultant system is especially prone to undergo a violent exothermic reaction with the direct formation of sodalite. An important feature of our novel process for producing the 4A zeolite resides in the fact that we initially react all or substantially all of the alkali that enters into the process with metakaolin at elevated temperature when each of these ingredients is substantially dry. Under these conditions sodalite formation is minimized. The intermediate obtained as a result of the high temperature reaction between alkali and metakaolin is less prone, when contacted with liquid water, to undergo a violent exothermic reaction with production of sodalite than is an unreacted mixture of alkali and metakaolin.

Our invention will be more fully understood by the detailed description and examples thereof which follow.

PRODUCTION OF PREREACTED NaOH-METAKAOLIN INTERMEDIATE PRODUCT

As previously indicated, we employ metakaolin as one of the starting materials in producing sodium zeolite A. Metakaolin is formed by dehydrating kaolin clay in a manner described hereafter and has the approximate formula $Al_2O_3 \cdot 2SiO_2$. By "kaolin clay" is meant a naturally occurring clay containing at least one of the following as the chief mineral constituent: kaolinite, halloysite, anauxite, dickite and nacrite. The aforementioned minerals are hydrous alumino-silicates whose composition may be represented by the formula:

$$Al_2O_3 \cdot 2SiO_2 \cdot XH_2O$$

where X is usually 2, or 4 in the case of certain halloysites. The weight ratio of $SiO_2$ to $Al_2O_3$ indicated by this formula is 1.177 to 1. The metakaolin we prefer to employ is one obtained from kaolin clay having a $SiO_2/Al_2O_3$ mol ratio as close to the theoretical value of 2.00 as is possible in order to provide a substantially pure zeolite. However, the metakaolin may be obtained from kaolin clays having somewhat higher or lower $SiO_2/Al_2O_3$ mol ratios, e.g., $2.00\pm.05$, although the ultimate zeolite will be somewhat pure than when the mol ratio in the metakaolin is 2.00 to 1. Kaolin clays are frequently associated with foreign materials such as quartz, and the removal of such materials from the kaolin facilitates the ultimate formation of the high purity type A zeolite. Hence, we prefer to use a kaolin clay which has been treated for removal of grit and foreign bodies, as well as clots of undispersed kaolin clay. To obtain metakaolin clay of suitable quality, kaolin may be dehydrated by calcination at a temperature within the range of from about 800° F. to about 1600° F., and preferably 1200° F. to 1500° F., for a time sufficient to remove substantially completely the water of crystallization from the clay. The presence of any water of hydration in the starting metakaolin is undesirable in that the steps hereafter set forth do not result in the desired end product when hydrated clay is employed. However, metakaolin containing up to about 0.75% by weight of water of hydration may be used with good results. The calcination time will vary with calcination temperature and with the equipment used. When the clay is calcined at temperature levels lower than about 800° F., the dehydration is not sufficiently extensive to render the clay suitable for total conversion to the zeolite, whereas when calcination is conducted at about 1600° F. or higher, undesirable changes in the clay may take place. The clay may be calcined at a temperature somewhat above 1600° F. if the calcination treatment is limited to a period of the order of minutes. At any rate, we find that if the calcination is too severe, the clay is altered with the formation of an unreactive constituent, thought to be mullite. When such an overcalcined clay is reacted in accordance with the method of the present invention, a different crystalline material is formed along with or to the exclusion of the desired type A zeolite. Thus, for the purposes of our invention, we distinguish between "reactive" and "unreactive" dehydrated kaolin clay and are careful to select a "reactive" dehydrated kaolin clay which we consider to be a kaolin calcined under conditions such that high temperature unreactive aluminum silicate, silica or alumina phases are not formed, so that essentially all of the dehydrated clay will react with alkali in amount stoichiometric for the formation of the type A zeolite. The starting metakaolin should be finely divided, e.g., all of the material should be minus 325 mesh.

The NaOH we employ in carrying out our process is dry. More specifically, the maximum quantity of water that can be associated with the NaOH and the metakaolin with which the NaOH is mixed is such that the NaOH concentration in such mixture will be at least about 80%. It may be seen that the maximum quantity of water which we can tolerate in forming this mixture is insufficient to form the monohydrate of NaOH. Completely anhydrous NaOH may be used but as a practical matter NaOH which carries with it a small but finite quantity of absorbed water will be more feasible. Commercial grades of "anhydrous" NaOH are illustrative of the latter and represent the preferred form of NaOH for purposes of the present invention. When water is present with the NaOH in amount in excess of that specified above, sodalite contaminant appears in the ultimate crystallized product. For example, when metakaolin is mixed with 2 mols of NaOH and the latter is in the form of a solution of about 50% concentration, the end product obtained by subjecting the mixture of metakaolin and 50% NaOH solution to high temperature, mixing with water, molding and aging, will be substantially pure sodalite rather than the desired 4A zeolite.

The caustic may be preground before blending it with the finely divided metakaolin. Alternatively, the caustic flake or lumps may be blended with the metakaolin, the mixture ground, as in a ball mill, and then post-blended with the metakaolin to obtain an intimate, apparently uniform mixture of NaOH and metakaolin.

The quantity of dry caustic we mix with the finely divided metakaolin, in accordance with the simplest form of our invention, is that which supplies 1 mol of $Na_2O$ per 2 mols of $SiO_2$ in the metakaolin. In other words, we employ a 36 percent alkali dosage, alkali dosage being defined as the weight of 100 percent NaOH per weight (volatile free basis) of metakaolin, expressed as a percentage. As mentioned, we use more than a 36 percent alkali dosage in forming the intermediate reaction product in carrying out that form of our invention in which we cut back the intermediate reaction product with additional metakaolin to form a composition in which the NaOH dosage in the total mixture is about 36 percent (calculated on the total metakaolin, reacted and unreacted). Excellent results have been obtained using a 72 percent NaOH dosage in the initial mixture and it is reasonable to expect that a considerably higher NaOH dosage, for example a 108 percent dosage, or even more, may be used. However, if the high temperature intermediate reaction product obtained with an alkali dosage in excess of 36 percent is cut back with metakaolin in amount such that the NaOH dosage in the cutback mixture is less than about 30 percent or as high as about 38 percent, a contaminated end product will be obtained.

The finely divided dry mixture of metakaolin and caustic is reacted at a temperature within the range of from about 300° F. to about 800° F. Reaction time is of course a function of reaction temperature and it depends, also, on the water content of the reactant mass. The higher the water content, the lower the temperature at which the reaction is initiated. The reaction is almost instantaneous and is exothermic in character. While a reaction time of only about 10 minutes, for example, will ordinarily suffice, we prefer to maintain the mass at 300° F. to 800° F. for about 2 hours to insure as complete reaction between the alkali and metakaolin as can be obtained. It has been found that no benefit is realized by prolonging this initial reaction beyond the 2 hour period. We prefer to conduct the reaction at an oven temperature of 800° F. since completion of reaction is favored by the higher temperature. It has been found, however, that temperature of the order of 1000° F. is too high since phases form at such temperatures which do not react with water to form the ultimate synthetic crystalline zeolite.

The high temperature reaction product, which is a friable lightly caked mass, is ground to minus 325 in a hammer mill or other suitable equipment. The product consists, at least in part, of an unidentified crystalline material. The greater the NaOH dosage employed with the starting metakaolin, the more intense the diffraction lines of the intermediate reaction product will be.

FORMATION OF MOLDED PARTICLES OF THE PREREACTED NaOH-METAKAOLIN INTERMEDIATE PRODUCT

Water is blended with the finely divided prereaction product described above to form an apparently homogeneous mixture of moldable consistency. When an alkali dosage in excess of 36 percent has been used in preparing the prereaction product, the product is cut back and blended with additional metakaolin. The amount of water we add to the prereaction product (or mixture of prereaction product plus additional metakaolin) is at least 2 mols per mol of total $SiO_2$ in the mixture. In practice, plastic moldable mixtures are obtained when sufficient water is added to provide mixes having volatile matter contents within the range of about 25 percent to 35 percent. The term "volatile matter" (V.M.) as used herein refers to the weight percentage of a material that is eliminated when the material is heated to constant weight at 1800° F. The optimum V.M. of the water tempered mass will depend on the molding method that is employed.

When water is added to the prereacted NaOH-metakaolin mixture, the mass is capable of undergoing an exothermic reaction which results in a loss of plasticity in the mass. Further, such reaction tends to get out of control with resultant sodalite formation. Therefore, we prefer to use cold water, i.e., water at 0° F. to 70° F., in forming the aqueous mixture of the prereaction product of NaOH and metakaolin. Excellent results have been obtained using cracked ice. However, by proper selection of molding equipment, water at about 70–75° F. or somewhat higher will suffice. Further, prevention of untimely mass reaction—before the mass is molded—may be obviated by molding the mass almost immediately after its formation. We prefer to mix the water or ice with the pulverized prereacted NaOH-metakaolin on a continuous basis and feed the plastic mass formed thereby directly into the molding equipment, also on a continuous basis. This may be done by mixing the water or ice with the prereacted product in a pug mill, cement mixer or the like and continuously feeding the pugged mixture through an auger extruder provided with dies and a cutter, thereby continuously producing pellets of the desired size. Preferably the jacket and barrel of the extruder are cooled as a further means of preventing reaction in the plastic mass. At any rate, the temperature of the water plasticized prereacted NaOH-metakaolin mass should be insufficient to permit dehydration during the particle forming step. Typically the molded pellets will be about 4 to 8 mesh although pellets of other particle size may be preferred. The mass may be molded by other means, such as pilling or sphering. For example, the prereacted mixture of metakaolin and caustic may be spray dried to form reaction masses in microspherical form by initially forming a dilute aqueous slurry of the prereacted mixture, e.g., a slurry having a 10 percent to 25 percent solids content. The water content of the slurry is then reduced to an amount of at least 2 mols per mol of NaOH in the mixture by spraying the slurry into an inert evaporative medium, such as warm air, thereby forming coherent microspherical particles which upon aging crystallize into the desired zeolite in the form of microspheres.

AGING AND CRYSTALLIZING THE MOLDED PARTICLES

The molded particles of water and preretacted NaOH-metakaolin (and additional metakaolin when necessary) are aged in an enclosed vessel to form a hydrous, homogeneous amorphous reaction product which is crystallizable into the type A zeolite upon further aging. The initial stage of the reaction is exothermic in nature, as mentioned, and must be carefully controlled so as to maintain the mass temperature below about 200° F. at atmospheric pressure or at least autogenous pressure until the exotherm has been completed. The reaction time may be as long as about a week when the particles are aged under atmospheric pressure in an atmosphere maintained at about 70° F. We have had excellent results aging the molded particles in an enclosed vessel at a temperature from about 100° F. to about 150° F. for 6 to 24 hours (with the longer aging being preferred at the aging temperature of 100° F.) following which the particles were further aged at more elevated temperature, such as 200° F., for 24 hours. The reacted mixture can be aged for longer periods, such as 48 or even appreciably more at temperatures of the order of 70° F. to 150° F. When this is done, the aged particles will crystallize, although the required time will be greater when the crystallization is conducted at more elevated temperatures.

The pellets are aged in an inert environment, such as oil or air, but not directly in contact with water which would leach constituents from the pellets during aging. When the aging is conducted at relatively low temperatures, the particles may be maintained in an atmosphere of inert uncirculated gas, such as air, at a temperature between about 70° F. and about 100° F. Higher gas temperatures may be used employing high velocity recirculated gas, which in the case of air, should be substantially free from $CO_2$.

Pursuant to a preferred embodiment of our invention, the particles are aged by immersing them in an organic liquid which is heated in an enclosed vessel to a temperature such that the temperature of the reaction mass does not exceed about 200° F. until aging is completed. The organic liquid we employ may be any one which is immiscible with and unreactive with the alkali solution present within the mass, and which is characterized further by a boiling point in excess of the maximum temperature to be reached by the masses during their reaction which, as noted above, is never in excess of about 200° F. The organic liquid may be a hydrocarbon oil such as mineral oil or, if desired, a halogenated hydrocarbon which is not hydrolyzed by the alkali. Other organic liquids may be used. Preferably, such organic liquid has a relatively low distillation end point, such as 550° F. or less, so that it may be readily removed from the product, as by steam distillation, after the product has crystallized. Another suitable method for aging the particles involves immersing them directly in an immiscible light petroleum cut, such as petroleum ether, which boils at a temperature below the maximum temperature to which it is desired to subject the masses. In this way reaction temperature is controlled by the boiling point of the organic liquid.

An important advantage of employing oil as the aging medium is that carbon dioxide from the atmosphere is excluded from the reactants so that reaction between any free alkali and carbon dioxide is precluded.

Although the particles are preferably aged in an environment of organic liquid or air under conditions to control the mass temperature during the reaction, other aging mediums should be feasible provided they are capable of controlling the mass temperature of the particles. Thus, the masses may be mixed with particulate inert matter, such as sand, which is of a different particle size or specific gravity from the reacted mass, and the whole heated to a temperature such that the reaction is advanced to completion while maintaining the mass temperature below about 200° F. Thereafter the particles of inert matter are separated, as by screening, gravity separation or other methods that will readily suggest themselves to those skilled in the art.

No agitation of the particles is required during aging and agitation strong enough to disintegrate or break up the particles is to be avoided.

To determine the minimum aging time required for the completion of the reaction under the particular operating conditions employed, samples of the reaction product may be taken after various reaction intervals. Aging should be prolonged until the product produces intense X-ray diffraction maxima characteristic of the desired zeolite.

ACTIVATION OF THE ZEOLITE

The zeolite may be dehydrated substantially completely to form the sieve material by calcination at a temperature within the range of from about 220° F. to about 1200° F. or somewhat higher, and usually between about 400° F. to about 700° F. The calcination time will depend on calcination temperature and atmosphere. The zeolite may be partially dehydrated for use in certain applications.

The sodium zeolite A we produce has a simple cubic crystal structure and a composition, expressed in terms of mols of oxides present (water free basis) as follows:

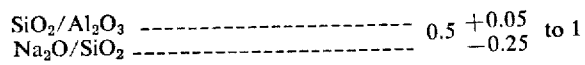

The unit cell dimension of the equilibrated hydrated sodium zeolite A was determined from X-ray powder diffraction patterns to be 12.27 A. The more significant $d$ values and corresponding line intensities for our sodium zeolite A are given below in Table I, wherein values were obtained from the X-ray powder diffraction pattern, using the K$\alpha$ doublet of copper, an X-ray diffractometer using a scintillation counter and a strip chart pen recorder. The relative intensity of the peaks and the inter-planar spacing ($d$ values) were calculated from the peak heights recorded on the chart in conventional manner. Also reported in Table I are significant $d$ values and relative peak intensities for a sodium aluminosilicate compound (believed to be sodalite) which forms as a contaminant or to the exclusion of the sodium zeolite A when reactant quantities and temperatures are not strictly controlled within the critical limits set forth above.

TABLE I.—$d$ VALUE AND RELATIVE INTENSITY OF REFLECTION IN ANGSTROM UNITS

| Sodium Zeolite A | | Sodium aluminosilicate contaminant | |
|---|---|---|---|
| $d$ Spacing A. | Relative intensity 100 I/I$_0$ | $d$ Spacing A. | Relative intensity 100 I/I$_0$ |
| 12.27 | 100 | 6.32 | 61 |
| 8.66 | 76 | 4.45 | 4 |
| 7.05 | 45 | 3.62 | 100 |
| 5.50 | 36 | 2.96 | 4 |
| 4.35 | 10 | 2.80 | 27 |
| 4.11 | 54 | 2.56 | 41 |
| 3.72 | 83 | 2.37 | 10 |
| 3.41 | 24 | 2.24 | 3 |
| 3.29 | 76 | 2.09 | 32 |
| 2.98 | 92 | 1.81 | 6 |
| 2.89 | 14 | 1.74 | 11 |
| 2.75 | 17 | | |
| 2.62 | 58 | | |
| 2.05 | 13 | | |
| 1.74 | 18 | | |

To provide other forms of zeolite A, the hydrated sodium zeolite A may be base-exchanged with other monovalent cations, such as ammonium, hydrogen, potassium and lithium; group II metal ions such as magnesium, calcium and strontium; and ions of transition metals such as nickel, titanium, chromium, iron, manganese, tungsten, as well as others whose atomic numbers are from 21–28, inclusive, 39–46, inclusive, and 72–78, inclusive. These other forms of zeolite A have essentially the same X-ray powder diffraction pattern characteristic of the sodium form set forth in Table I, and have a cubic cell unit between about 12.0 and 12.4 A. Upon dehydration, as described above, these base-exchanged zeolites become sorbents of controlled effective pore diameter. The base-exchange step is conveniently accomplished by soaking, percolating, or otherwise contacting the zeolite with a dilute aqueous solution of a mineral acid salt of the above-mentioned ions (or other exchangeable ions) until the desired degree of ion-exchange has taken place.

From the preceding description of the invention, it will be readily apparent that an important feature of the method of our invention is that we have been able to provide hard coherent aggregates of type A zeolites, both the parent zeolite A and base-exchanged reaction products, as well as the various sorbents produced by dehydrating such zeolites, without resorting to the step of binding powdered masses. Moreover, our zeolitic aggregates are materially more resistant to attrition than prior art bonded masses and the difference is readily obvious by comparing the ease with which such bonded masses are crushed or broken by hand with the difficulty in breaking up the zeolitic masses produced by the method of the subject invention. Our zeolitic aggregates, even in the hydrated form, are resistant to breakdown in the presence of liquid water.

The following examples of the practice of our invention are given for illustrative purpose only and are not to be construed as limiting our invention thereto.

Example I

This example illustrates the production of self-bonded pellets of type 4A zeolite by our process.

Thirty-six parts by weight of anhydrous sodium hydroxide flakes were ground in a hammer mill and then blended with 100 parts by weight of Pigment 33 (a commercial metakaolin) in a Simpson mixer to produce an apparently uniform mixture of the particles of sodium hydroxide with the metakaolin. The mixture was placed in open silica trays and placed in an oven maintained at 800° F. for one hour. The cooled mass was ground in a hammer mill to 100% minus 325 mesh. Water was uniformly mixed into the milled material to a V.M. of 29.6%, thereby forming a plastic mass. The plastic mass was immediately fed slowly through an auger extruder operating at 44 r.p.m. and having a ½″ land with 0.169″ holes.

The extruded pellets were placed in sealed glass containers which were held for 24 hours in an oven maintained at 100° F. The oven temperature was increased to 200° F. and the sealed containers maintained at this temperature for an additional 24 hours to produce pellets which consisted of a 4A zeolite of acceptable purity.

*Example II*

This example illustrates the production of extruded pellets of high purity 4A zeolite from a starting mixture of metakaolin and twice the theoretical dosage of dry caustic.

Seventy-two parts by weight of anhydrous sodium hydroxide flakes were blended with 100 parts by weight of Pigment 33 in a rotary glass lined drum for about 10 minutes. The mixture was ground in a Raymond hammer mill (0.024" screen) and then rolled in the drum for an additional 20 minutes. The mixture of alkali and metakaolin was transferred into opened silica trays and placed in an oven maintained at 300° F. for 2 hours. The cooled product, which contained the anhydrous reaction product of 72 parts by weight of NaOH and 100 parts by weight of metakaolin, was ground in a hammer mill and blended to apparent homogeneity with 92.5 parts by weight of Pigment 33. It will be noted that this quantity of additional metakaolin provided a mixture in which the dosage of NaOH was 34.6%, somewhat less than that stoichiometric for the formation of the 4A zeolite with the total $Al_2O_3$ and $SiO_2$ in the mixture. Sufficient water was added to this mixture to form a mass having a V.M. of about 30%. The mass was mixed to apparent homogeneity and immediately slowly fed to the extruder described in Example I. The extruded pellets were aged in sealed glass containers at 100° F. for 24 hours and further aged in the sealed containers at 200° F. for an additional 24 hours.

GAS ADSORPTION

The ethane and propane adsorption capacities of the pelleted product were compared with those of activated commercial pelleted zeolite by standard gas adsorption procedures. The results are reported in Table II.

a greater resistance to attrition than the commercial spheres.

TABLE III.—HARDNESS OF 4A ZEOLITES

| Sample | Particle size, mesh | Avg. weight percent after abrasion test | | | |
|---|---|---|---|---|---|
| | | 4/6 | 6/8 | 8/10 | 10/4 |
| Commercial spheres | 6/8 | | 61.7 | 7.7 | 5.6 |
| Test pellets | 4/6 | 81.1 | 3.4 | 1.5 | 1.1 |

*Example III*

This example illustrates the production of 4A zeolite pellets by prereacting anhydrous caustic and metakaolin and aging a water tempered mixture of the reaction product in contact with a hydrocarbon oil.

Pigment 33 was mixed with a 72% dosage of hammer milled anhydrous NaOH flakes in a muller. The mixture was maintianed in a 500° F. oven for 2 hours, cooled and ground in a hammer mill. Metakaolin was blended with the milled product in amount to form a mixture in which the theoretical NaOH concentration was 36%. Crushed ice was added to the metakaolin diluted NaOH-metakaolin reaction product and the temperature of the mixture dropped to 50° F. and slowly began to increase. The pugged mixture was extruded in a Welding Engineer's Extruder operated at 22 r.p.m. and with a die having a ¼" land and 0.169" holes. The freshly extruded pellets were immersed in light white mineral oil in an enclosed reactor provided with means for continuously circulating the oil throughout the bed of pellets in the reactor and with an immersion heater in the oil circulation line for controlling the oil temperature. The oil temperature was maintained at 100° F. to 110° F. for 24 hours while the oil circulated throughout the pellets. The oil temperature was then increased to 200° F. and circulated throughout the pellets at this temperature for 24 hours.

We claim:

1. A method for forming a synthetic crystalline zeolite which comprises forming a substantially dry apparently

TABLE II.—GAS ADSORPTION OF TYPE A MOLECULAR SIEVES

| Sample | Particle size, inches | Density gms./ml. | Gas adsorption (25° C., 760 mm. Hg) in 1 hr. per 100 gms. adsorbent | | Ethane/ propane | Percent capacity ethane adsorbed in— | | |
|---|---|---|---|---|---|---|---|---|
| | | | Ethane | Propane | | 5 min. | 10 min. | 15 min. |
| Commercial pellets | 0.0625 | 1.30 | 4.84 | 0.34 | 14.2 | 69.5 | 78.0 | 85.4 |
| Commercial spheres | 0.093 to 0.185 | 1.54 | 5.32 | 0.52 | 10.2 | 81.0 | 90.8 | 93.6 |
| Test pellets | 0.170 | 1.49 | 5.06 | 0.42 | 12.0 | 71.0 | 84.5 | |

The data reported in Table II indicates that our pelleted molecular sieve had an ethane capacity, selectivity and adsorption rate which compared favorably with those of the commercial 4A molecular sieves.

HARDNESS

A sample of our zeolite pellets produced from alkali and metakaolin as described above was calcined at 600° F. for 1 hour. An 80 ml. portion of the 4/6 mesh fraction was weighed and placed in a metal cylinder 3½" in diameter and 4¾" long along with four steel balls 15/16" in diameter. The container was sealed and rolled at 75 r.p.m. for 1 hour. The sample was screened on a Ro-Tap screen for 5 minutes and the fractions retained by the screens were weighed and recorded as the weight percentage of the original sample.

Table III contains the hardness data for this test sample as well as that of a commercial spherical 4A zeolite (6/8 mesh). Although the data in Table III represent a comparison between spheres and pellets (which are inherently more susceptible to attrition loss due to chipping of edges), the data indicate that the test pellets have homogeneous mixture of metakaolin and NaOH, heating said mixture at a temperature of from about 300° F. to 800° F. for a time sufficient to react said metakaolin with said NaOH, mixing a small amount of water with the reaction product to form a mixture of moldable consistency, molding said mixture into particles, and aging said molded particles without dissolving constituents thereof under at least autogenous pressure, so as to prevent dehydration of said particles, until said particles crystallize.

2. A method of forming sodium zeolite A which comprises forming a mixture of 1 mol of metakaolin and 2 mols of NaOH while restricting the quantity of water in the resultant mixture to an amount insufficient to form a monohydrate with said NaOH at room temperature, heating said mixture at a temperature of from about 300° F. to 800° F. for a time sufficient to react said metakaolin with said NaOH, mixing water with the reaction product so as to form a moldable mixture, molding the mixture into shaped particles and aging the molded particles without dissolving constituents thereof under at least autogenous pressure, so as to prevent dehydration of said particles, until said particles crystallize.

3. A method of forming aggregates of sodium zeolite A which comprises dry mixing 1 mol of metakaolin with at least 2 mols of NaOH, heating said mixture at a temperature of about 300° F. to 800° F. for a time sufficient to react said metakaolin with said NaOH, uniformly mixing the resultant reaction product with an additional quantity of metakaolin in the amount of 1 mol for every 2 mols of NaOH present in said mixture in excess of 2 mols and with water in an amount to form a mixture of plastic consistency, molding said mixture into shaped particles while still of plastic consistency, and aging the molded particles without leaching out constituents thereof under at least autogenous pressure, so as to prevent dehydration of said particles, for a time sufficient to crystallize the particles.

4. A method of forming aggregates of sodium zeolite A which comprises forming a mixture consisting essentially of 1 mol of metakaolin and 2 to 6 mols of NaOH while restricting the quantity of water in the mixture so that the NaOH concentration in said mixture is from about 80% to 100%, heating said mixture at a temperature of about 300° F. to 800° F. for at least 15 minutes thereby to form a pulverulent reaction product, mixing said reaction product with an additional quantity of metakaolin in the amount of 1 mol for every 2 mols of NaOH present in said mixture in excess of 2 mols and with water in amount to form a mixture of plastic consistency, molding said mixture while still of plastic consistency, aging the molded mixture without leaching at about 100° F. to about 150° F. for at least about 12 hours under atmospheric pressure, and further aging the molded mixture without leaching under atmospheric pressure for a time sufficient for constituents of said molded mixture to crystallize and at a temperature which is higher than the first-mentioned aging temperature and does not exceed about 200° F., thereby to prevent dehydration of the molded mixture.

5. A method for producing pellets of sodium zeolite A which comprises forming a uniform mixture consisting of 1 mol dry metakaolin and 2 mols dry NaOH, heating said mixture at 300° F. to 800° F. for at least 2 hours so as to form a pulverulent reaction product, cooling said reaction product, mixing said reaction with an amount of water at a temperature of from 0° F. to 70° F. in amount sufficient to form an extrudable mass having a V.M. content within the range of about 25% to 30%, and immediately after said extrudable mass is formed, extruding it so as to form pellets therefrom while cooling the mixture in the extruder so as to prevent the temperature of the mass from rising during the extrusion, and aging the extruded pellets without leaching under atmospheric pressure for a time sufficient to crystallize said pellets and at a temperature controlled so that pellet temperature does not exceed about 200° F., thereby to prevent dehydration of said pellets.

6. A method for producing sodium zeolite A directly in the form of self-bonded shaped particles which comprises forming a substantially dry mixture consisting of 1 mol of metakaolin and 4 mols of NaOH, heating said mixture at a temperature of about 300° F. to 800° F. for at least about 10 minutes so as to cause reaction between said metakaolin and said NaOH, cooling said reaction product and mixing it with 1 mol of metakaolin and water at 0° F. to 70° F. in amount sufficient to form an extrudable mixture, extruding said mixture into pellets while cooling the mixture during the extrusion, and aging the pellets out of contact with an external liquid aqueous phase under atmospheric pressure for at least 24 hours and at a temperature controlled so that pellet temperature does not exceed about 200° F., thereby to prevent dehydration of said pellets.

7. A method for forming sodium zeolite A which comprises forming a mixture of 1 mol of metakaolin and 2 mols of NaOH while restricting the quantity of water in the resultant mixture to an amount insufficient to form a monohydrate with said NaOH at room temperature, heating said mixture at a temperature of from about 300° F. to 800° F. for a time sufficient to react said metakaolin with said NaOH, mixing water with the reacted mixture in amount such as to form a slurry of sprayable consistency, spraying said slurry into an evaporative medium so as to form microspheres, and aging said micropheres under at least autogenous pressure, thereby to prevent dehydration of said microspheres, without dissolving constituents thereof until said microspheres crystallize.

8. A method for forming a synthetic crystalline zeolite which comprises forming a substantially dry homogeneous mixture of metakaolin and NaOH, heating said mixture at a temperature of from about 300° F. to 800° F. for a time sufficient to react said metakaolin with said NaOH, mixing a small amount of water with the reaction product and forming the mixture into particles, and aging said particles without dissolving constituents thereof under at least autogenous pressure, so as to prevent dehydration of said particles, until said particles crystallize.

9. A method of forming sodium zeolite A which comprises forming a mixture of 1 mol of metakaolin and 2 mols of NaOH while restricting the quantity of water in the resultant mixture to an amount insufficient to form a monohydrate with said NaOH at room temperature, heating said mixture at a temperature of from about 300° F. to 800° F. for a time sufficient to react said metakaolin with said NaOH, mixing water with the reaction product and forming the mixture into shaped particles, and aging the shaped particles without dissolving constituents thereof under at least autogenous pressure, so as to prevent dehydration of said particles, until said particles crystallize.

10. A method of forming aggregates of sodium zeolite A which comprises dry mixing 1 mol of metakaolin with at least 2 mols of NaOH, heating said mixture at a temperature of about 300° F. to 800° F. for a time sufficient to react said metakaolin with said NaOH, uniformly mixing the resultant reaction product with an additional quantity of metakaolin in the amount of 1 mol for every 2 mols of NaOH present in said mixture in excess of 2 mols and with water in an amount to form a mixture of plastic consistency, forming said mixture into shaped particles and aging the shaped particles without leaching out constituents thereof under at least autogenous presure, so as to prevent dehydration of said particles, for a time sufficient to crystallize the particles.

References Cited in the file of this patent

UNITED STATES PATENTS

| | | |
|---|---|---|
| 2,143,670 | Young | Jan. 10, 1939 |
| 2,544,695 | Kumins | Mar. 13, 1951 |

OTHER REFERENCES

Kumins et al.: 2nd and Eng. Chem. 45, 567–572 (1953).

UNITED STATES PATENT OFFICE
CERTIFICATE OF CORRECTION

Patent No. 3,100,684　　　　　　　　　　　　　　　August 13, 1963

Walter L. Haden, Jr., et al.

It is hereby certified that error appears in the above numbered patent requiring correction and that the said Letters Patent should read as corrected below.

Column 2, line 4, for "for" read -- from --; column 8, line 30, for "preretacted" read -- prereacted --; column 9, lines 55 and 56, should appear as shown below instead of as in the patent:

$$SiO_2/Al_2O_3 \text{ -------- } 2 \pm 0.05 \text{ to } 1$$

$$Na_2O/SiO_2 \text{ -------- } 0.5 \pm \genfrac{}{}{0pt}{}{0.05}{0.025} \text{ to } 1$$

Signed and sealed this 3rd day of March 1964.

(SEAL)
Attest:

ERNEST W. SWIDER

Attesting Officer

EDWIN L. REYNOLDS

Acting Commissioner of Patents

UNITED STATES PATENT OFFICE
CERTIFICATE OF CORRECTION

Patent No. 3,100,684                                                                      August 13, 1963

Walter L. Haden, Jr., et al.

It is hereby certified that error appears in the above numbered patent requiring correction and that the said Letters Patent should read as corrected below.

Column 2, line 4, for "for" read -- from --; column 8, line 30, for "preretacted" read -- prereacted --; column 9, lines 55 and 56, should appear as shown below instead of as in the patent:

$$SiO_2/Al_2O_3 \text{ -------- } 2 \pm 0.05 \text{ to } 1$$

$$Na_2O/SiO_2 \text{ --------- } 0.5 \pm \genfrac{}{}{0pt}{}{0.05}{0.025} \text{ to } 1$$

Signed and sealed this 3rd day of March 1964.

(SEAL)
Attest:

ERNEST W. SWIDER

Attesting Officer

EDWIN L. REYNOLDS

Acting Commissioner of Patents